United States Patent
Nam

(10) Patent No.: US 7,155,640 B2
(45) Date of Patent: Dec. 26, 2006

(54) HDD DEFECT LIST SEARCHING METHOD

(75) Inventor: Hye-jeong Nam, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 573 days.

(21) Appl. No.: 10/715,856

(22) Filed: Nov. 19, 2003

(65) Prior Publication Data

US 2004/0153845 A1    Aug. 5, 2004

(30) Foreign Application Priority Data

Nov. 19, 2002 (KR) .................. 10-2002-0071969

(51) Int. Cl.
*G06F 11/00* (2006.01)
(52) U.S. Cl. .................. 714/42; 714/5; 369/53.15; 369/53.17
(58) Field of Classification Search ........... 714/42; 369/53.15, 53.17
See application file for complete search history.

(56) References Cited

U.S. PATENT DOCUMENTS

| | | | | |
|---|---|---|---|---|
| 6,249,884 B1* | 6/2001 | Joo | ................ | 714/42 |
| 6,584,583 B1* | 6/2003 | Nam | ................ | 714/42 |
| 6,701,465 B1* | 3/2004 | Tashiro | ................ | 714/54 |
| 6,906,989 B1* | 6/2005 | Furuhashi | ................ | 369/53.17 |
| 6,925,580 B1* | 8/2005 | Hoskins | ................ | 714/8 |
| 7,000,152 B1* | 2/2006 | Lin | ................ | 714/42 |
| 7,036,057 B1* | 4/2006 | Wu | ................ | 714/723 |
| 2004/0078705 A1* | 4/2004 | Ko | ................ | 714/42 |

FOREIGN PATENT DOCUMENTS

| | | |
|---|---|---|
| JP | 1993-28651 | 2/1993 |
| JP | 5028651 | 2/1993 |
| JP | 2002-63767 | 2/2002 |
| KR | 1999-28007 | 4/1999 |
| KR | 1999-0065700 | 8/1999 |
| KR | 1999-65700 | 8/1999 |
| KR | 2001-2478 | 1/2001 |

OTHER PUBLICATIONS

Notice of Office Action issued by the Korean Patent Office on Nov. 22, 2004.

* cited by examiner

*Primary Examiner*—Robert Beausoliel
*Assistant Examiner*—Christopher McCarthy
(74) *Attorney, Agent, or Firm*—Staas & Halsey LLP

(57) ABSTRACT

A hard disk drive (HDD) defect list searching method includes checking whether a target track is on a non-defective track list when a command to access the target track is applied, obtaining defect information from the non-defective track list if the target track is on the non-defective track list, searching for a defect list if the target track is not on the non-defective track list and obtaining defect information, including the number of defects existing between a starting track of a zone where the target track belongs and the target track and the number of defects in the target track, from the defect list, and obtaining defect information on the target track and defect information on tracks ranging from the target track to a next defective track from the defect list and storing the defect information to the target track and the next defective track on the non-defective track list.

11 Claims, 6 Drawing Sheets

> BEFORE PERFORMING SLIP METHOD

> AFTER PERFORMING SLIP METHOD

HDD DEFECT LIST SEARCHING METHOD

CROSS-REFERENCE TO RELATED APPLICATIONS

This application claims the priority of Korean Patent Application No. 2002-71969, filed on Nov. 19, 2002, in the Korean Intellectual Property Office, the disclosure of which is incorporated herein in its entirety by reference.

BACKGROUND OF THE INVENTION

1. Field of the Invention

The present invention relates to a hard disk drive (HDD) defect list searching method, and more particularly, to an HDD defect list searching method which reduces the number of times a defect list is referred to by storing defect information of a target track and information on a next defective track and using the defect information of the target track and the information on the next defective track the next time the defect list is searched for.

2. Description of the Related Art

A hard disk drive (HDD) is a magnetic recording medium on which data can be recorded and is comprised of a plurality of circular disks, i.e., media. Data are recorded along tracks, which are concentric circles formed on the surface of a disk. Each track on the surface of a disk is divided into blocks, which are called sectors, so that data can be systematically recorded on the disk and data already recorded on the disk can be systematically searched for. Information on the location of each of the sectors is represented by specific identifiers, such as a cylinder or track number, a head for recording/reproducing data on/from a data storage medium by accessing the data storage medium, and a sector number.

A disk is rotated by a spindle motor, and data are recorded on and reproduced from the disk by read and write heads provided at an actuator arm.

Sometimes, a disk may have a defective region on which data cannot be recorded and from which data cannot be reproduced.

For example, when loading an actuator assembly onto a medium during the manufacture of an HDD, the medium may get some scratches, which causes defects.

Physical damage to the surface of the medium caused by scratches causes a loss of a number of bytes, which are basic units of data recorded on and/or reproduced from the medium. Since a disk is controlled on a sector basis or on a track basis, a defect caused by a scratch on the surface of the disk affects at least one sector.

Defective sectors cannot store data. Accordingly, it is important to provide an HDD which does not seem to have any defective sectors, to a user by searching the HDD for defective sectors and replacing the defective sectors with normal sectors during the manufacture of the HDD.

During the manufacture of an HDD, a burn-in test is performed. The burn-in test is used to figure out whether or not and where a defect has occurred on a disk by performing read and write tests on the entire region of the disk while changing data patterns and read and write conditions by deliberately deviating a head from tracks of the disk or while changing read and write channel parameters. The location of the defect on the disk is represented by a cylinder number, a head number, and a sector number. The identified location of the defect and an error code are written on a defect list or a slip list so that a user can be prevented from accessing the place where the defect has occurred. This defect list searching method is disclosed in Korean Patent Laid-open Publication No. 1999-65700 published on Aug. 5, 1999.

Even though discontinuity exists in sectors due to some defective sectors, sector addresses, which are necessary to access the sectors, must be consecutively provided. Accordingly, a process of replacing defective sectors with normal sectors in a spare region is necessary, and this process is called defect management.

There are two different defect managing methods, i.e., a slip method and a reassign method.

The slip method is mainly used to manage defects on a disk, which are detected in a burn-in test, and the reassign method is mainly used to manage defects occurring during a user's use of an HDD.

The two defect managing methods are similar in that defective sectors are replaced using a spare region but are different in the way they use the spare region when replacing the defective sectors. Specifically, in the slip method, defective sectors in a data region are replaced by their adjacent sectors in the data region, and then in the end, as many sectors as the number of defective sectors in the data region are compensated for by sectors in a spare region. On the other hand, in the reassign method, defective sectors in the data region are replaced by sectors in the spare region. These two defect managing methods are respectively disclosed in Japanese Patent Laid-open Publication No. 2002-63767 (published on Feb. 28, 2002) and Korean Patent Laid-open Publication No. 2001-2478 (published on Jan. 15, 2001).

In a case where data are recorded on and/or reproduced from a disk by an external device, such as a host computer, which accesses an HDD, the HDD obtains defect information indicating whether or not a target track includes defective sectors and how many defective sectors the target track has, by referring to a defect list recorded in a system region of the disk, and generates sector addresses necessary to access sectors of the target track by referring to the defect information. This defect searching method is disclosed in Japanese Patent Laid-open Publication No. 1993-28651 (published on Feb. 5, 1993) and Korean Patent Laid-open Publication No. 1999-28007 (published on Apr. 15, 1999).

However, in the conventional defect list searching methods, whenever a host computer accesses an HDD, the host computer has to search for defect information on the entire tracks of a disk by referring to a defect list, and requires many additional operations of the HDD and delays access to data.

SUMMARY OF THE INVENTION

The present invention provides an advanced defect list searching method which reduces the number of times a defect list is referred to by storing in advance defect information on a target track and information on a following defective track and using the information when searching for the defect list later.

Additional aspects and/or advantages of the invention will be set forth in part in the description which follows and, in part, will be obvious from the description, or may be learned by practice of the invention.

According to an aspect of the present invention, there is provided a hard disk drive (HDD) defect list searching method. The method includes checking whether a target track is on a non-defective track list when a command to access the target track is applied, obtaining defect information from the non-defective track list if the target track is on the non-defective track list, searching for a defect list if the target track is not on the non-defective track list and obtaining defect information, including the number of defects existing between a starting track of a zone where the target track belongs and the target track and the number of defects in the target track, from the defect list, and obtaining defect information on the target track and defect information on tracks ranging from the target track to a next defective track from the defect list and storing the defect information to the target track and the next defective track on the non-defective track list.

The defect information on the tracks ranging from the target track to the next defective track may indicate a distance between the target track and the next defective track.

The non-defective track list may be one of managed and renewed during operation of an HDD.

According to another aspect of the present invention, there is provided a target track accessing method including: receiving a read/write command from a host; checking whether a target track is listed on a non-defective track list; obtaining defect information from the non-defective track list when the target track is listed on the non-defective track list; obtaining defect information from the defect list on the target track and information on a next defective track from the defect list when the target track is not on the non-defective track list and storing the defect information from the defect list on the target track and information on a next defective track on the non-defective track list; and obtaining a physical address to access the target track based on the defect information obtained from the obtaining defect information from the non-defective track list when the target track is listed on the non-defective track list and obtaining defect information from the defect list when the target track is not on the non-defective track list.

According to yet another aspect of the present invention, there is provided a defect list search method including: storing defect information on a target track and information on a next defective track; accessing the stored defect information on the next defective track when a read/write command is received; obtaining a physical address of a current target track by referring to defect information on the previous target track when a current target track to be accessed in response to the read/write command belongs to a track range indicated by the information on the next defective track. The next defective track indicates a track existing right next to the target track and including defective sectors. The information on the next defective track indicates a distance between the target track and the next defective track.

According to still another aspect of the present invention, there is provided a disc drive including: a read/write channel circuit which receives a read/write command from a host; a storage section which stores a non-defective track list and a defect track list; a microprocessor which checks whether a target track is listed on the non-defective track list when the read/write command is received and obtains one of defect information from the non-defective track list when the target track is listed on the non-defective track list and defect information from the defect list on the target track and information on a next defective track from the defect list when the target track is not on the non-defective track list, stores the defect information from the defect list on the target track and information on a next defective track on the non-defective track list, and obtains a physical address to access the target track based on the defect information obtained from the non-defective track list when the target track is listed on the non-defective track list and obtaining defect information from the defect list when the target track is not on the non-defective track list.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
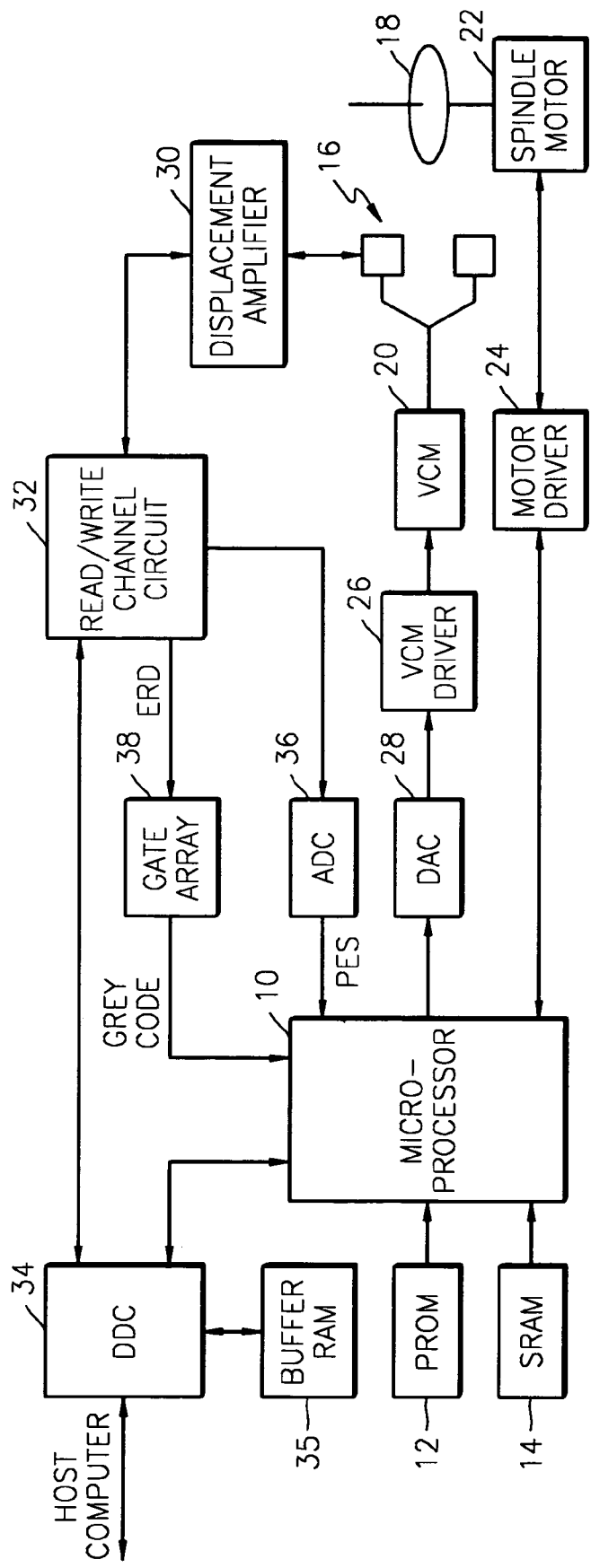
FIG. 1 is a block diagram of a hard disk drive (HDD)

Reference will now be made in detail to embodiments of the present invention, examples of which are illustrated in the accompanying drawings, wherein like reference numerals refer to the like elements throughout. The embodiments are described below to explain the present invention by referring to the figures.

FIG. 1 is a block diagram of a hard disk drive (HDD). Referring to FIG. 1, a microprocessor 10 controls general operations of an HDD and is connected to a programmable ROM (PROM) 12 storing a predetermined control program and data and a static RAM (SRAM) 14 temporarily storing data.

A head is attached to an end of an actuator (not shown) and writes/reads data on/from a disk 18, being driven to move over tracks of the disk 18 from an inner track to an outer track or vice versa. A voice coil motor (VCM) 20 drives the actuator in response to the level of current and polarity applied thereto. A digital-to-analog converter (DAC) 28 converts a digital control signal applied from the microprocessor 10 to an analog signal and applies the analog signal to a VCM driver 26 controlling the driving of the VCM 20.

In response to a control signal applied from the motor driver 24, a spindle motor 22 rotates the disk 18 resting upon a driving axis.

Being controlled by the microprocessor 10, a read/write channel circuit 32 receives data to be recorded from a digital data converter (DDC) 34, encodes the data, and outputs the encoded data to a displacement amplifier 30. The read/write channel circuit 32 extracts address information from an analog read signal input from the displacement amplifier 30 and outputs the extracted address information to a gate array 38 as an encoded read data (ERD) signal.

An analog-to-digital converter (ADC) 36 is connected to the read/write channel circuit 32. The ADC 36 receives an analog servo read signal from the read/write channel circuit 32, converts the analog servo read signal into a digital signal, i.e., a position error signal (PES), and outputs the PES to the microprocessor 10.

The gate array 38 is connected to the read/write channel circuit 32. The gate array 38 receives the ERD signal from the read/write channel circuit 32, detects various servo information including grey code recorded on a servo region of the disk 18, and outputs the detected servo information.

The DDC 34 includes a sequencer performing a predetermined operation according to a firmware program downloaded from the microprocessor 10. The DDC 34 records data on the disk 18 using the read/write channel circuit 32 and the displacement amplifier 30 or transmits data reproduced from the disk using the read/write channel circuit 32 and the displacement amplifier 30 to the host computer. In addition, the DDC 34 serves as an interface between the host computer and the microprocessor 10.

Data transmitted among the host computer, the microprocessor 10, and the read/write channel circuit 32 are temporarily stored in a buffer memory (not shown) and then processed.

The microprocessor 10 controlling the operation of the HDD controls track search and track following in response to a read or write command input from the host computer. The PROM 12 stores a program controlling the operation of the microprocessor 10 and various setting values.

Figure 2:
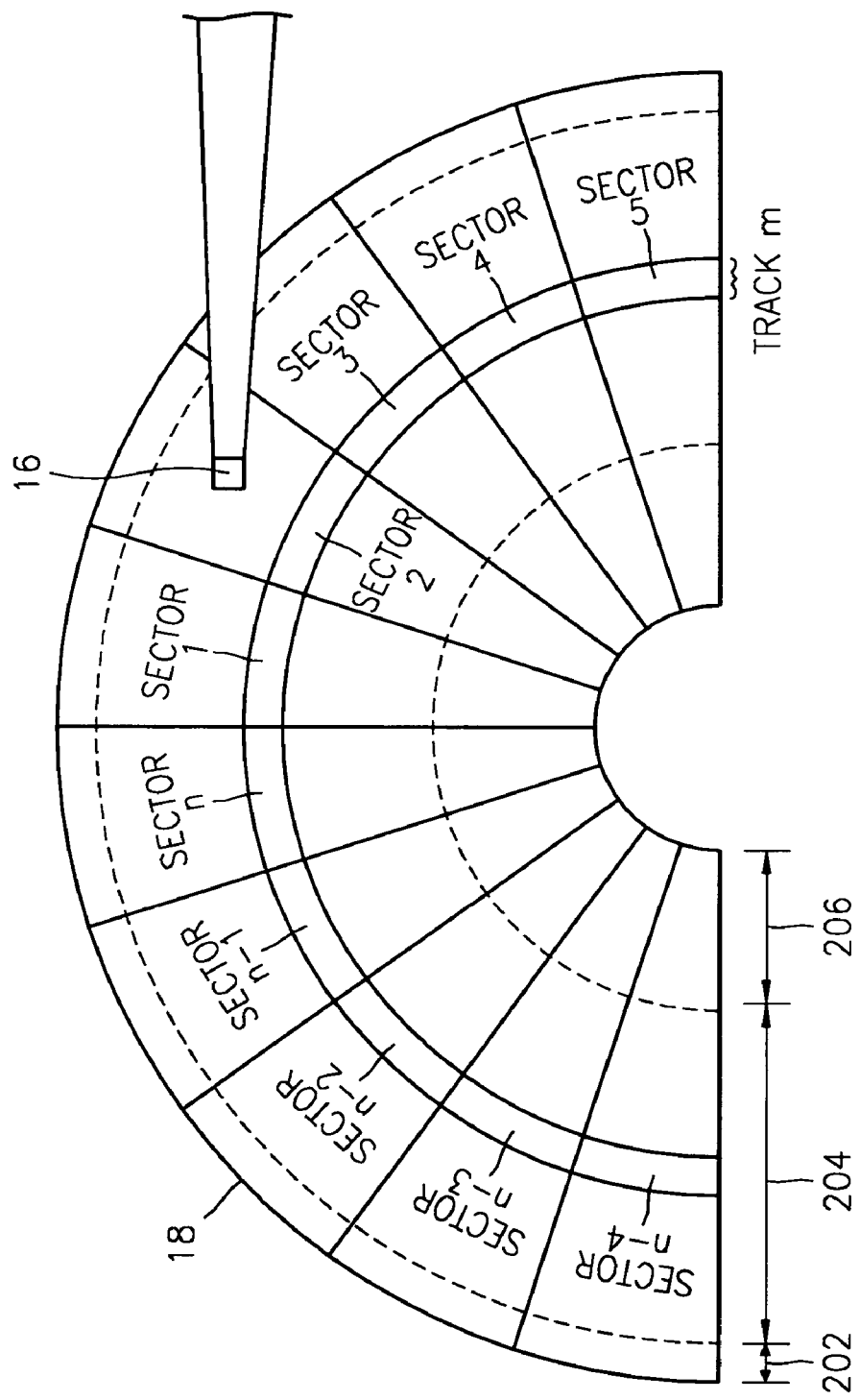
FIG. 2 is a diagram illustrating the conventional format of a disk.

FIG. 2 is a diagram illustrating the format of a disk. Referring to FIG. 2, a disk 18 is divided into a system region 202, a user data region 204, and a parking region 206. The system region 202 is also called a maintenance region. In the system region 202, various system information and information necessary to maintain and fix an HDD are stored, and a user's access to the system region 202 is not allowed. In the user data region 204, user data are stored. The parking region 206 is used to park a head.

In the system region 202, a serial number of an HDD, information on the manufacture of the HDD, and a defect list are recorded.

The user data region 204 occupies most of the area of the disk 18, and data are recorded on the disk 18 on a sector basis. Sectors and tracks of the disk 18 have information indicating their locations, i.e., addresses. For example, FIG. 2 shows sectors of an m-th track in detail. In FIG. 2, numbers allotted to each of the sectors show a physical sequence of the sectors.

Figure 3A:
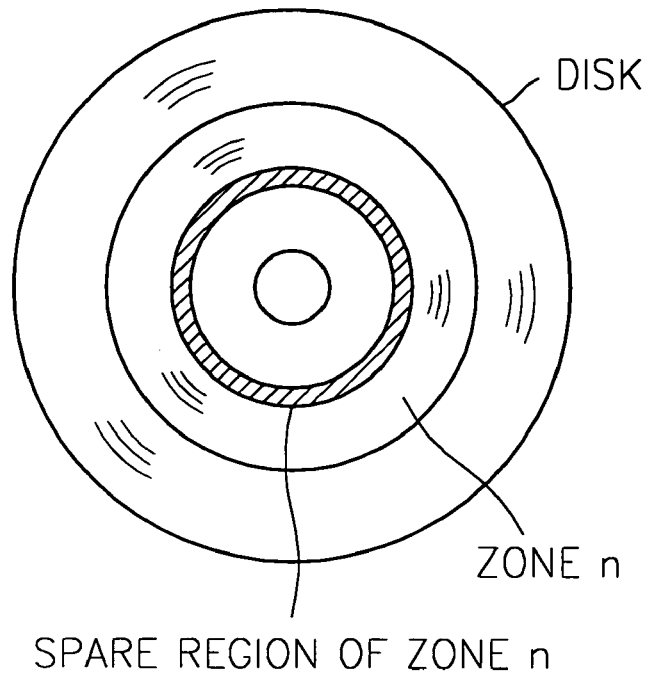
FIGS. 3A and 3B are diagrams illustrating a conventional method of using a spare region in defect management.
Figure 3B:
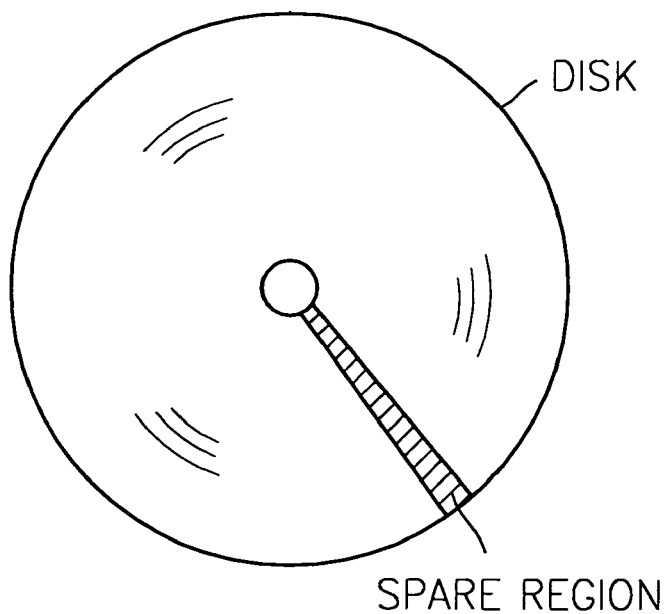

FIGS. 3A and 3B are diagrams illustrating a method of using a spare region in defect management. In FIG. 3A, a spare region is allotted to each zone. In FIG. 3B, a spare region is allotted to each cylinder or each track.

Specifically, in FIG. 3A, concentric tracks on a disk are divided into several zones in a radial direction, and a spare region marked by deviant lines is allotted to each of the zones. Accordingly, each spare region is comprised of a plurality of tracks. For a better access to a spare region, an innermost track of each of the zones may be set up as a spare region.

In FIG. 3B, a spare region marked by deviant lines is allotted to each cylinder. Accordingly, each spare region is comprised of a plurality of sectors and is set up for each track.

As explained above, there are two different defect managing methods. One is a slip method, and the other is a reassigning method. In the defect managing method called a "slip" method, when a defect occurs at a defective sector, sector addresses subsequent to an address of the defective sector are slipped one by one so that any of the sector addresses subsequent to the address of the defective sector is replaced by its previous sector address.

Figure 4:
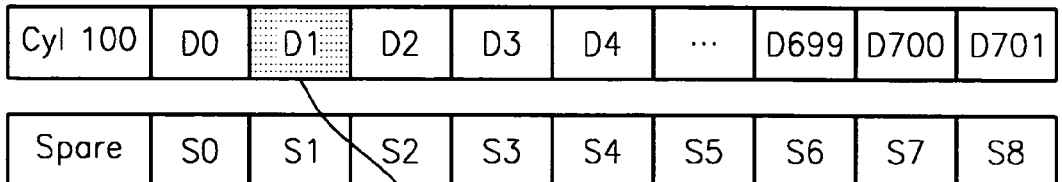
FIG. 4 is a diagram illustrating a conventional slip method.
Figure 4:
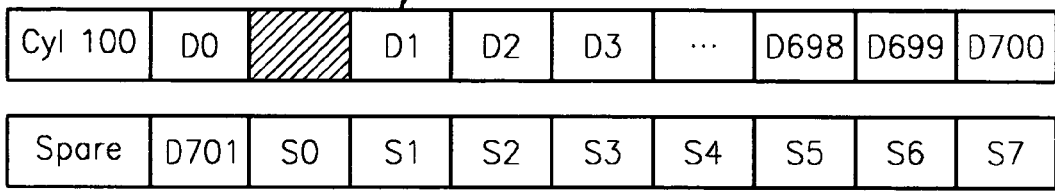

FIG. 4 is a diagram illustrating a slip method by comparing sectors before and after a slip method is performed on them. In the upper part of FIG. 4, a track, which is provided on a disk in a concentric shape, is illustrated as a straight line shape for the convenience of explanation. D0 through D701 represent sectors in a data region, and S0 through S8 represent sectors in a spare region. Consecutive numbers are respectively allotted to adjacent sectors arranged in a row.

A method of replacing a defective sector D1 is as follows.

The defective sector D1 is replaced by an adjacent sector D2, and an address of the defective sector D1 is allotted to the sector D2.

The sector D2 is replaced by an adjacent sector D3, and an address of the sector D2 is allotted to the sector D3. This replacement method is applied to other sectors in the data region.

As a result of the replacement, there is no sector to replace a final sector D701. Accordingly, a final sector D701 is replaced by a first sector S0 in the spare region.

In the lower part of FIG. 4, sectors on which the replacement method is performed are shown. A sector marked by slanting lines is a sector on which a defect management process has been performed and is no longer used. In FIG. 4, an arrow indicates that the defective sector D1 is replaced by its adjacent sector D2, and thus the sector D2 is accessed with the address of the defective sector D1.

In the slip method, even though there exists a defective sector in a data region, it is possible to maintain continuity of sector addresses. Accordingly, in order to access a target track, the number of defective sectors existing between a starting track of a zone where a target track belongs and the target track is calculated. Then, a physical address necessary to access the target track is produceable by referring to the number of defective sectors in the target track.

A microprocessor reads a defect list recorded in a system region and stores the defect list in a static RAM by initialization. Thereafter, the microprocessor checks if there are defective sectors in the target track by referring to the defect list stored in the static RAM and informs a sequencer of the result of the check. The sequencer generates physical addresses of a track and a sector to be accessed by referring to the information input from the microprocessor.

Figure 5:
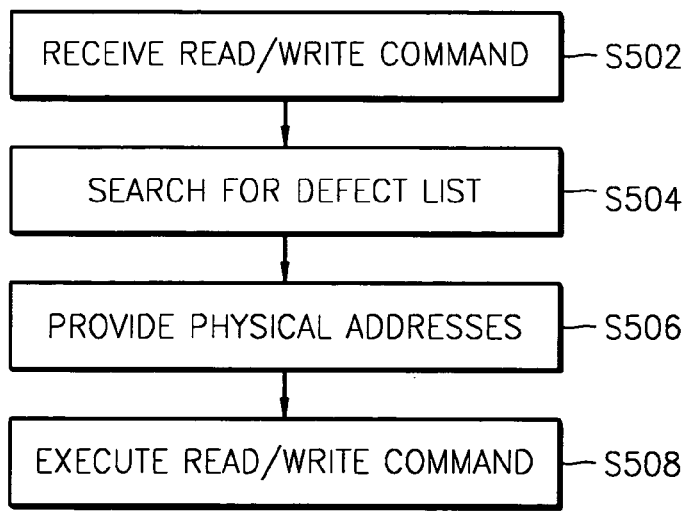
FIG. 5 is a flowchart of a conventional defect list searching method.

FIG. 5 is a flowchart of a conventional defect list searching method where a spare region provided on a disk in the manner shown in FIG. 3A is applied.

A read/write command is received from a host in operation s502.

The number of defects existing between a starting track of a zone where a target track belongs and the target track and the number of defects in the target track are obtained in operation s504.

In operation s506, a physical address necessary to access the target track is obtained based on the defect information obtained in operation s504.

In response to the read/write command, a read/write operation is performed in operation s508 by using the physical address.

According to the conventional defect list searching method shown in FIG. 5, a defect list must be searched whenever a read/write command is received from a host. In other words, every time a read/write command is received from a host, the number of defects existing between a starting track of a zone where a target track belongs and the target track and the number of defects in the target track must be obtained. Accordingly, a considerable amount of time is taken to obtain a physical address necessary to access the target track, which causes an access delay.

The present embodiment of the present invention provides an improved defect list searching method performed by an HDD in order to solve the problem with the conventional defect list searching method shown in FIG. 5, thus reducing the time taken to access a disk.

Specifically, when a read/write command is received from a host, defect information on a target track and information on a next defective track are stored and then will be used to search for a defect list later, thus reducing the number of times the defect list is searched for. The defect information on the target track is obtained in the same manner as in the conventional defect list searching method shown in FIG. 5. Here, the "next defective track" indicates a track existing right next to the target track and including defective sectors, and the "information on the next defective track" indicates a distance between the target track and the next defective track.

In other words, in the defect list searching method according to the present embodiment of the present invention, defect information on a target track and information on a next defective track are stored. Then the information on the next defective track is referred to before everything when a read/write command is received, so as to reduce the number of times a defect list is referred to. In particular, in a case where a current target track to be accessed in response to the read/write command belongs to a predetermined track range indicated by the information on the next defective track, which means there is no defect between a previous target track and the current target track, a physical address of the current target track is obtainable by referring to defect information on the previous target track.

The defect list searching method of the present embodiment of the present invention due to the characteristics of a process of accessing a disk that a track located closest to a previously accessed track is most likely to be accessed after the previously accessed track.

The defect information on the target track and the information on the next defective track (hereinafter, referred to as non-defective track list) are managed. The non-defective track list is managed as long as an HDD is operating and is stored in a static memory.

Figure 6:
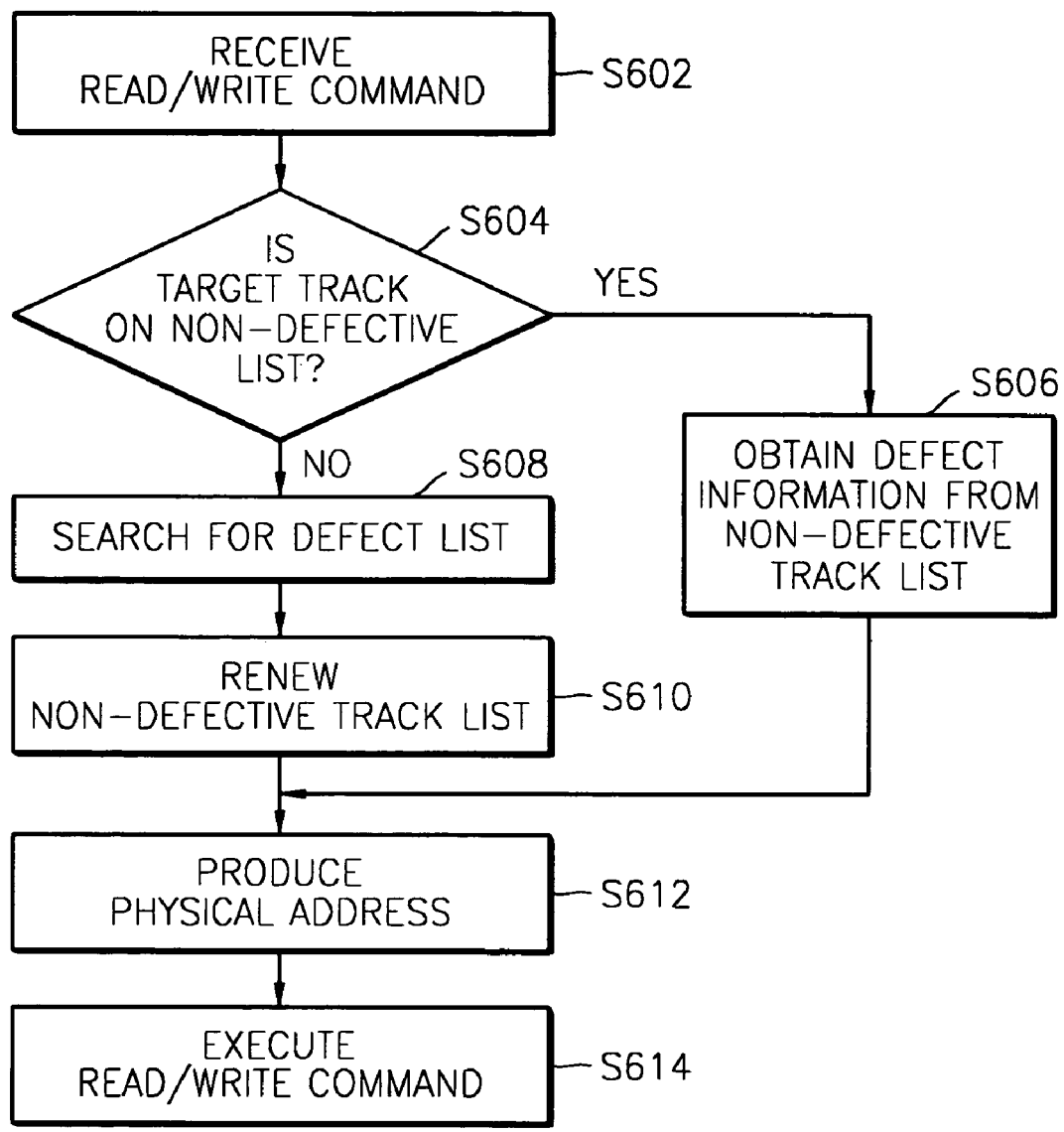
FIG. 6 is a flowchart of a defect list searching method according to an embodiment of the present invention.

FIG. 6 is a flowchart of a defect list searching method according to an embodiment of the present invention where a spare region provided on a disk in the manner shown in FIG. 3A.

A read/write command is received from a host in operation s602.

It is checked whether or not a target track belongs to a non-defective track list in operation s604.

Defect information is obtained from the non-defective track list in operation s606 if the target track is on the non-defective track list.

A defect list is searched for in operation s608 if the target track is not on the non-defective track list.

Defect information, i.e., the number of defects existing between a starting track of a zone where the target track belongs and the target track and the number of defects in the target track, is obtained from the defect list.

The defect information on the target track and information on a next defective track are obtained from the defect list and are stored on the non-defective track list in operation s610.

In operation s612, a physical address necessary to access the target track is obtained based on the defect information obtained in operation s606 or s608.

In operation s614, a read/write operation is performed in response to the read/write command by using the obtained physical address.

Figure 7:
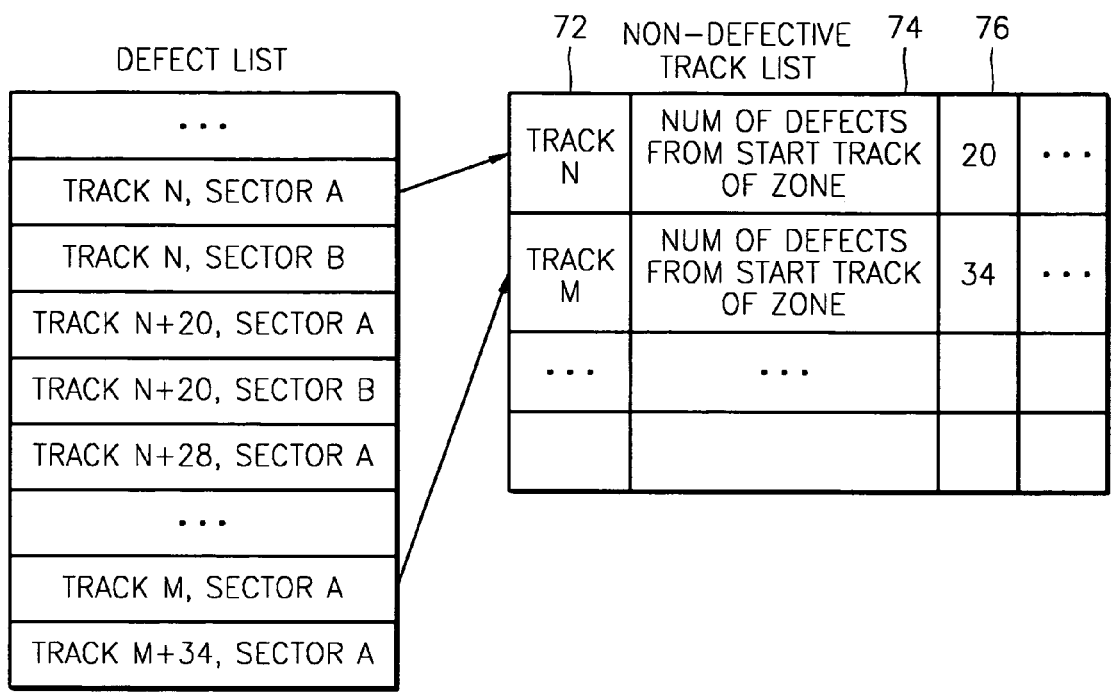
FIG. 7 is a diagram illustrating a defect list and a non-defective track list usable with the method of FIG. 6.

FIG. 7 is a diagram showing a defect list and a non-defective track list. Specifically, a defect list and a non-defective track list are shown in the left and right sides, respectively, of FIG. 7.

On the defect list, track numbers and sector numbers representing defective sectors are written. Track addresses gradually increase so that an inner track address is greater than an outer track address. Defect lists are sorted by a key of track addresses. A zone represents a predetermined track range, and a starting point of the zone is representable by a predetermined track address.

The non-defective track list is made with reference to the defect list. A previous target track (72 of FIG. 7), which has already been accessed, the number (74 of FIG. 7) of defects existing between a starting track of a zone and a target track, and a distance, i.e., the number of tracks (76 of FIG. 7), between the target track and a next defective track are stored to the defect list.

It is possible to figure out that a track N and a track N+20 are defective tracks based on the defect list shown in FIG. 7. Accordingly, the number of defects existing between a starting track of a zone where the track N belongs and the track N and the distance between the track N and the track N+20, i.e., 20, are stored to the non-defective track list.

The distance between a target track and a next defective track indicates that there does not exist any defect in as long a track range as the distance. Accordingly, defect information on the target track is directly usable to access tracks between the pre-referred track and the next defective track.

For example, as shown in FIG. 7, there is no defect in a track range from a track N+1 to a track N+19, and thus defect information on the track N is directly usable to access the tracks N+1 through N+19.

According to the above-described embodiment of the present invention, defect information on a target track and information on a next defective track are managed by using a non-defective track list. The non-defective track list is renewed every time a disk is accessed and is managed or renewed during operation of an HDD.

The defect list searching method according to the present embodiment of the present invention has been described above taking a spare region provided to each zone on a disk as an example. However, the present embodiment of the present invention can also be applied to the case of providing a spare region to each cylinder on a disk. In the case of providing a spare region to each cylinder on a disk, defects existing between a starting point of a track and a desired sector are counted, while defects existing between a starting track of a zone and a target track are counted in the case of providing a spare region to each zone.

Information on a next defective track, which has been described above as being stored to a non-defective track list, may be written on a defect list as long as there still remains some space in the defect list for the information on the next defective track.

The defect list searching method according to the present embodiment of the present invention maintains defect information on a target track and information on a next defective track and refers to the non-defective track list firstly when a read/write command is received. Accordingly, it is possible to reduce the number of times the defect list is referred to and improve the speed of accessing data recorded on a disk.

Although a few embodiments of the present invention have been shown and described, the present invention is not limited to the disclosed embodiments. Rather, it would be appreciated by those skilled in the art that changes may be made in this embodiment without departing from the principles and spirit of the invention, the scope of which is defined in the claims and their equivalents.

What is claimed is:

1. A hard disk drive (HDD) defect list searching method, comprising:
   checking whether a target track is on a non-defective track list when a command to access the target track is applied;
   obtaining defect information from the non-defective track list if the target track is on the non-defective track list;
   searching for a defect list if the target track is not on the non-defective track list and obtaining defect information, including the number of defects existing between a starting track of a zone where the target track belongs and the target track and the number of defects in the target track, from the defect list; and
   obtaining defect information on the target track and defect information on tracks ranging from the target track to a next defective track from the defect list and storing the defect information on the target track and the next defective track to the non-defective track list.

2. The method of claim 1, wherein the defect information indicates a distance between the target track and the next defective track.

3. The method of claim 1, wherein the non-defective track list is one of managed and renewed during operation of an HDD.

4. The method of claim 1, wherein track numbers and sector numbers representing defective sectors are written on the defect list.

5. The method of claim 1, wherein the non-defective track list is made with reference to the defect list.

6. The method of claim 1, wherein a previous target track which has already been accessed, a number of defects existing between a starting track of a zone and a target track, and a distance between the target track and a next defective track are stored on the defect list.

7. The method of claim 6, wherein the distance is measured in units of tracks.

8. A target track accessing method comprising:
   receiving a read/write command from a host;
   checking whether a target track is listed on a non-defective track list;
   obtaining defect information from the non-defective track list when the target track is listed on the non-defective track list;
   obtaining defect information from the defect list on the target track and information on a next defective track from the defect list when the target track is not on the non-defective track list and storing the defect information from the defect list on the target track and information on a next defective track on the non-defective track list; and
   obtaining a physical address to access the target track based on the defect information obtained from the obtaining defect information from the non-defective track list when the target track is listed on the non-defective track list and obtaining defect information from the defect list when the target track is not on the non-defective track list.

9. The method of claim 8, wherein the defect information includes a number of defects in the target track and one of a number of defects existing between a starting track of a zone where the target track belongs and the target track and a number of defects between a starting point of a track and a desired sector.

10. A defect list search method comprising:
    storing defect information on a target track and information on a next defective track;
    accessing the stored defect information on the next defective track when a read/write command is received;
    obtaining a physical address of a current target track by referring to defect information on the previous target track when a current target track to be accessed in response to the read/write command belongs to a track range indicated by the information on the next defective track,
    wherein the next defective track indicates a track existing right next to the target track and including defective sectors, and
    wherein the information on the next defective track indicates a distance between the target track and the next defective track.

11. A disc drive comprising:
    a read/write channel circuit which receives a read/write command from a host;
    a storage section which stores a non-defective track list and a defect track list;
    a microprocessor which checks whether a target track is listed on the non-defective track list when the read/write command is received and obtains one of defect information from the non-defective track list when the target track is listed on the non-defective track list and defect information from the defect list on the target track and information on a next defective track from the defect list when the target track is not on the non-defective track list, stores the defect information from the defect list on the target track and information on a next defective track on the non-defective track list, and obtains a physical address to access the target track based on the defect information obtained from the obtaining defect information from the non-defective track list when the target track is listed on the non-defective track list and obtaining defect information from the defect list when the target track is not on the non-defective track list.

* * * * *